United States Patent
Lee et al.

(10) Patent No.: US 7,072,660 B2
(45) Date of Patent: Jul. 4, 2006

(54) CODE REUSE APPARATUS IN CDMA WIRELESS COMMUNICATION SYSTEM USING BEAMFORMING BY ANTENNA ARRAY AND CODE REUSE METHOD THEREFOR

(75) Inventors: Jong-hyeuk Lee, Seongnam (KR); Sung-jin Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 303 days.

(21) Appl. No.: 10/698,945

(22) Filed: Nov. 3, 2003

(65) Prior Publication Data

US 2004/0136343 A1 Jul. 15, 2004

(30) Foreign Application Priority Data

Nov. 1, 2002 (KR) ............... 10-2002-0067404

(51) Int. Cl.
*H04Q 7/20* (2006.01)
(52) U.S. Cl. .............. 455/447; 455/62; 455/450; 455/509; 370/329; 370/441
(58) Field of Classification Search .......... 370/328, 370/329, 331, 332, 335, 341–342, 431, 441, 370/465; 455/62, 63.1, 67.11, 423, 424, 455/452.1, 452.2, 509, 562.1, 447, 450
See application file for complete search history.

(56) References Cited

U.S. PATENT DOCUMENTS

| 5,515,378 A | * | 5/1996 | Roy et al. ............ 370/334 |
| 5,592,490 A | * | 1/1997 | Barratt et al. ............ 370/310 |
| 5,862,479 A | * | 1/1999 | Cutler et al. ............ 455/428 |
| 5,886,988 A | * | 3/1999 | Yun et al. ............ 370/329 |
| 6,642,894 B1 | * | 11/2003 | Gross et al. ............ 343/705 |
| 2002/0006798 A1 | * | 1/2002 | Jaenecke et al. ............ 455/446 |
| 2002/0146029 A1 | | 10/2002 | Kavak et al. |
| 2002/0146060 A1 | | 10/2002 | Ertel et al. |
| 2003/0108084 A1 | | 6/2003 | Bolourchi et al. |
| 2003/0114162 A1 | | 6/2003 | Chheda et al. |
| 2003/0157897 A1 | * | 8/2003 | Maeda et al. ............ 455/67.3 |
| 2004/0063468 A1 | * | 4/2004 | Frank ............ 455/561 |

OTHER PUBLICATIONS

Ng, et al., IEEE 6th Int. Symposium on Spread-Spectrum Tech & Appli. NJIT, NJ/USA 88-92(Sep. 6, 2000).

* cited by examiner

*Primary Examiner*—William Trost
*Assistant Examiner*—James D. Ewart
(74) *Attorney, Agent, or Firm*—Lee & Morse, P.C.

(57) ABSTRACT

A code reuse apparatus in a code division multiple access wireless communication system using beamforming by an antenna array and a code reuse method therefor, wherein the method includes examining a spatial correlation between a new mobile station requesting communication and each of existing mobile stations using already allocated codes, based on long-term information reflecting spatial characteristics of beams transmitted to the new and existing mobile stations, and selecting one among the already allocated codes to reuse as a code for the new mobile station depending on the results of the correlation examination. As a result, the factual number of mobile stations for one base station may be close to the theoretic number of mobile stations corresponding to power gain by beamforming.

19 Claims, 15 Drawing Sheets

CODE REUSE APPARATUS IN CDMA WIRELESS COMMUNICATION SYSTEM USING BEAMFORMING BY ANTENNA ARRAY AND CODE REUSE METHOD THEREFOR

BACKGROUND OF THE INVENTION

1. Field of the Invention

The present invention relates to a code reuse apparatus in a code division multiple access (CDMA) wireless communication system using beamforming by an antenna array, and a code reuse method therefor.

2. Description of the Related Art

For efficient use of limited frequency resources, a code division multiple access (CDMA) scheme using an identical frequency bandwidth divided by codes, and a space division multiple access (SDMA) scheme using an antenna array, are being utilized. The standardization organization has recently discussed methods for combining the CDMA scheme with the SDMA scheme in order to enhance frequency efficiency.

In general, the SDMA scheme may be operated by beamforming using an antenna array. Here, if the beamforming is applied to a downlink, unlike an uplink, it is difficult to accurately find space information of a user. Accordingly, the SDMA scheme considers gains obtained by power reduction of a base station rather than code reuse.

As a communication system using an antenna array, a fixed beamforming method suggested by Nokia, an eigenbeamforming method suggested by Siemens, and an enhanced eigenbeamforming method suggested by Samsung are presently being discussed by the 3GPP standardization association. The subject of reusing codes in a beamforming system was proposed by Nokia, which has claimed that code reuse is possible as Nokia uses the fixed beamforming method in which a beam shape is pre-fixed.

A conventional code allocation method in a CDMA system will now be briefly described.

FIG. 1A illustrates a diagram depicting a conventional code allocation method in a CDMA system. A mobile communication system shown in FIG. 1A is constructed of a base station 140, a first mobile station 110, a second mobile station 120, and a third mobile station 130. The base station 140 has three antennas 141, 142, and 143, each of which manages a single sector spanning 120°, and is shielded by shielding means 144.

For example, the antenna 141 transmits the same code to the first, second, and third mobile stations 110, 120 and 130, which are positioned in the managed sector. Each of the mobile stations 110, 120 and 130 communicates by recognizing only the code known to that mobile station among the codes transmitted from the base station. That is, the first mobile station 110 recognizes only the code known to the first mobile station 110, and the second mobile station 120 recognizes only the code known to the second mobile station 120, etc. In this method, the mobile stations communicate with the base station.

In the conventional system shown in FIG. 1A, even though each mobile station communicates only with the code it knows, interference caused by transmitting the same codes to all the mobile stations cannot be avoided.

FIG. 1B illustrates a conceptual diagram of a code allocation method used in an eigenbeamforming method.

A mobile communication system shown in FIG. 1B is constructed of a base station 180, a first mobile station 150, a second mobile station 160, and a third mobile station 170. The base station 180 includes antenna arrays 181, 182, and 183. The antenna array 181 communicates with the mobile stations positioned in a sector A. Here, the antenna array 181 does not transmit all the codes to each of the mobile stations. Rather, the antenna array 181 generates and transmits a beam to each mobile station using a code allocated to each mobile station. The first mobile station 150 receives only a first beam 151 transmitted from the antenna array 181, the second mobile station 160 receives only a second beam 161 transmitted from the antenna array 181 and the third mobile station 170 receives only a third beam 171 transmitted from the antenna array 181. Therefore, although there is a slightly overlapped sector (a), the first and second mobile stations 150 and 160 may communicate with the antenna array 181 without co-interference.

A weight value used for beamforming is generated by optimally combining long-term information including space-axis information and short-term information including time-axis information. The space-axis information reflects a departure of angle (DOA), which is an angle formed by the base station with the mobile station, as well as an angle spread (AS). The time-axis information reflects Doppler shifting and multipath. The long-term information, which is affected by the location of the mobile station and reflects a long-term variation of a channel, varies very slowly. On the other hand, the short-term information is affected by the movement of the mobile station and reflects only an instantaneous variation of a channel.

In the mobile communication system shown in FIG. 1B, in a case that a number of mobile stations equal to the number of codes usable by the base station are already in communication with the base station, when a new mobile station requests communication, there is no code left to be allocated to the new mobile station, even when the base station has plenty of power to spare. For example, suppose that the power of the base station is 100% and the number of codes usable by the antenna array 181 is 3. When the first mobile station 150 uses 10% of the power of the base station via the first code, the second mobile station 160 uses 20% of the power of the base station via the second code, and the third mobile station 170 uses 20% of the power of the base station via the third code, even though only 50% of the power of the base station is being used, there is no code left to be allocated to a new user that enters the sector A. Accordingly, the new user cannot communicate with the base station and power of the base station is wasted.

SUMMARY OF THE INVENTION

The present invention provides a code reuse method and apparatus that allow a new mobile station requesting communication with a base station to reuse a code already allocated to an existing mobile station, thus preventing a waste of power of the base station.

In accordance with a feature of an embodiment of the present invention, there is provided a code reuse method in a code division multiple access (CDMA) wireless communication system using beamforming by an antenna array, the method including (a) examining a spatial correlation between a new mobile station requesting communication and each of existing mobile stations using already allocated codes, based on long-term information reflecting spatial characteristics of beams transmitted to the new and existing mobile stations and (b) selecting one among the already allocated codes to reuse as a code for the new mobile station depending on the results of the correlation examination.

In the method above and in code reuse apparatuses to be described later, the long-term information preferably includes beam shape and beam size information.

In the method and apparatuses, it is also preferable that the beam shape information includes a departure of angle representing an angle formed between a beam transmitted to a mobile station and a base station, and an angle spread reflecting a thickness of the beam.

In the method above, (a) preferably includes calculating orthogonal values between the long-term information of the new mobile station and the long-term information of the existing mobile stations using the already allocated codes. Also, (a) preferably includes selecting a minimum orthogonal value from the calculated orthogonal values and comparing the selected minimum orthogonal value with a predetermined critical value. Further, (b) preferably includes selecting an already allocated code of an existing mobile station having the minimum orthogonal value as the code for the new mobile station when the selected minimum orthogonal value is less than the predetermined critical value.

In accordance with another feature of an embodiment of the present invention, there is provided a code reuse apparatus in a base station of a CDMA wireless communication system using beamforming by an antenna array, the apparatus including a correlation examination unit for examining a spatial correlation between a new mobile station requesting communication and each of existing mobile stations using already allocated codes, based on long-term information reflecting spatial characteristics of beams transmitted to the new and existing mobile stations, and a reuse code selection unit for selecting one among the already allocated codes to reuse as a code for the new mobile station depending on the results of the correlation examination.

The correlation examination unit preferably calculates orthogonal values between the long-term information of the new mobile station and the long-term information of the existing mobile stations using the already allocated codes. Also, the correlation examination unit preferably selects a minimum orthogonal value from the calculated orthogonal values and compares the selected minimum orthogonal value with a predetermined critical value.

The reuse code selection unit preferably selects an already allocated code of an existing mobile station having the minimum orthogonal value as the code for the new mobile station when the selected minimum orthogonal value is less than the predetermined critical value.

In accordance with another feature of an embodiment of the present invention, there is provided a code reuse apparatus in a base station in a CDMA wireless communication system, the apparatus including an orthogonal code generation unit for determining whether a code will be reused or not and generating orthogonal code information according to the determination results, a long-term information and code information storage unit for storing long-term information reflecting spatial characteristics of beams transmitted to existing mobile stations and code information allocated to the existing mobile stations, and a code reuse unit for examining a spatial correlation between a new mobile station requesting communication and each of the existing mobile stations using already allocated codes, based on the long-term information and selecting one among the already allocated codes to reuse as a code for the new mobile station depending on the results of the correlation examination.

The orthogonal code generation unit preferably includes a code reuse determination unit for determining whether an unused code remains to be allocated to the new mobile station, outputting a code reuse OFF signal to the code reuse unit when an unused code remains, and outputting a code reuse ON signal to the code reuse unit when no unused code remains, and a code allocation unit for allocating a remaining unused code to the new mobile station when the code reuse OFF signal is output, and outputting the code information allocated to the existing mobile stations to the long-term information and code information storage unit when the code reuse ON signal is output.

The long-term information and code information storage unit preferably further stores a mobile station index corresponding to the stored long-term information and code information.

The code reuse unit preferably includes an orthogonality comparison unit for comparing the long-term information of the existing mobile stations having the already allocated codes, which is received the long-term information and code information storage unit, with long-term information of the new mobile station, when the code reuse ON signal is received from the orthogonal code generation unit, and a reuse code selection unit for selecting an already used code as a code for the new mobile station depending on the results of the orthogonality comparison.

The orthogonality comparison unit preferably includes a minimum orthogonal value selection unit for selecting a minimum orthogonal value among the orthogonal values between the long-term information of the existing mobile stations using the already allocated codes and the long-term information of the new mobile station requesting communication, and a reuse possibility determination unit for outputting an index having the minimum orthogonal value to the reuse code selection unit when the selected minimum orthogonal value is less than a predetermined critical value. The reuse code selection unit preferably receives the index from the reuse possibility determination unit and selects the code corresponding to the index as the code for the new mobile station.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIGS. 18A through 18C illustrate simulation results showing a weight value usable by a second user when a first user is using a predetermined weight value according to the code reuse method of the present invention, wherein FIG. 18A is a diagram illustrating a shape of a beam used by the first user; FIG. 18B is a diagram illustrating a shape of a beam usable by the new user, and FIG. 18C is a diagram illustrating a shape of a beam usable by the new user from all angles.

DETAILED DESCRIPTION OF THE INVENTION

Korean Patent Application No. 2002-67404, filed Nov. 1, 2002, and entitled: "Code Reuse Apparatus In CDMA Wireless Communication System Using Beamforming By Antenna Array And Code Reuse Method Therefor," is incorporated by reference herein in its entirety.

The structure and operation of an embodiment of a code reuse apparatus in a CDMA wireless communication system according to the present invention and a code reuse method according to the present invention will be described with reference to the appended drawings.

To begin with, the concept of a code reuse method in a CDMA system according to the present invention will be described with reference to FIG. 2A.

Figure 1A:
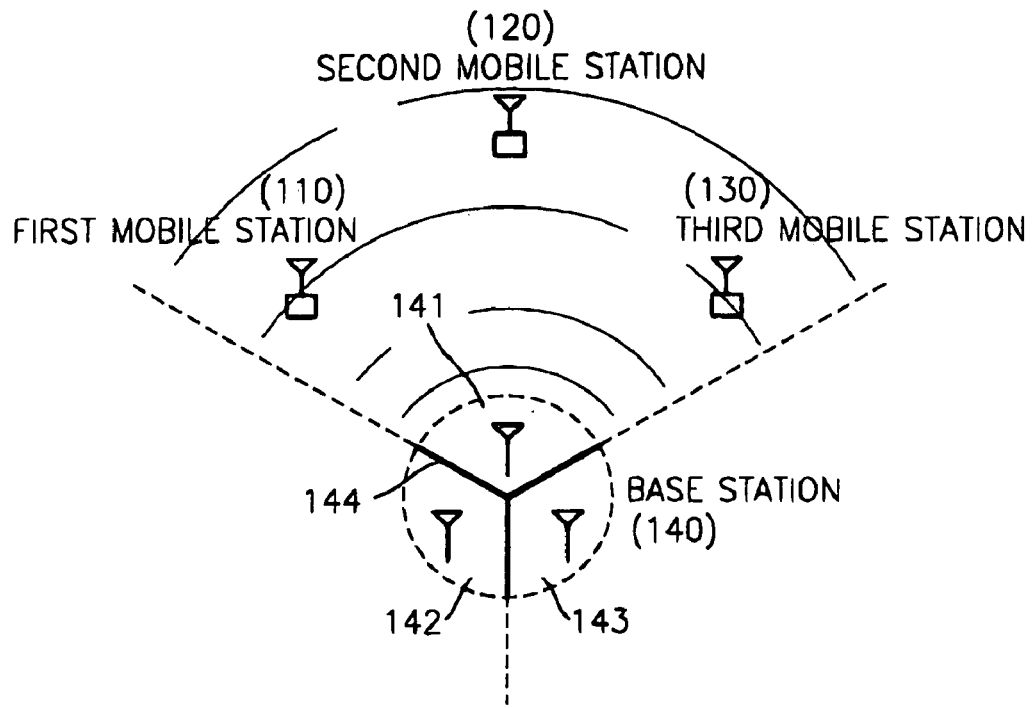
FIG. 1A is a diagram illustrating a conventional code allocation method in a CDMA system.
Figure 1B:
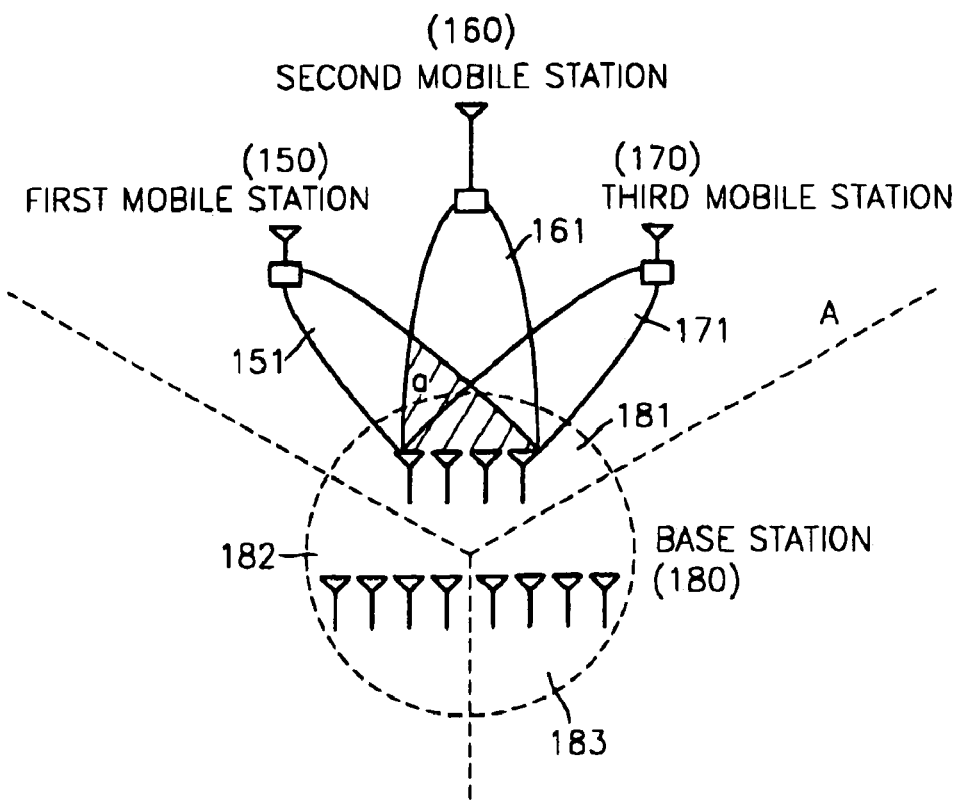
FIG. 1B is a diagram illustrating a code allocation method in an eigenbeamforming method.
Figure 2A:
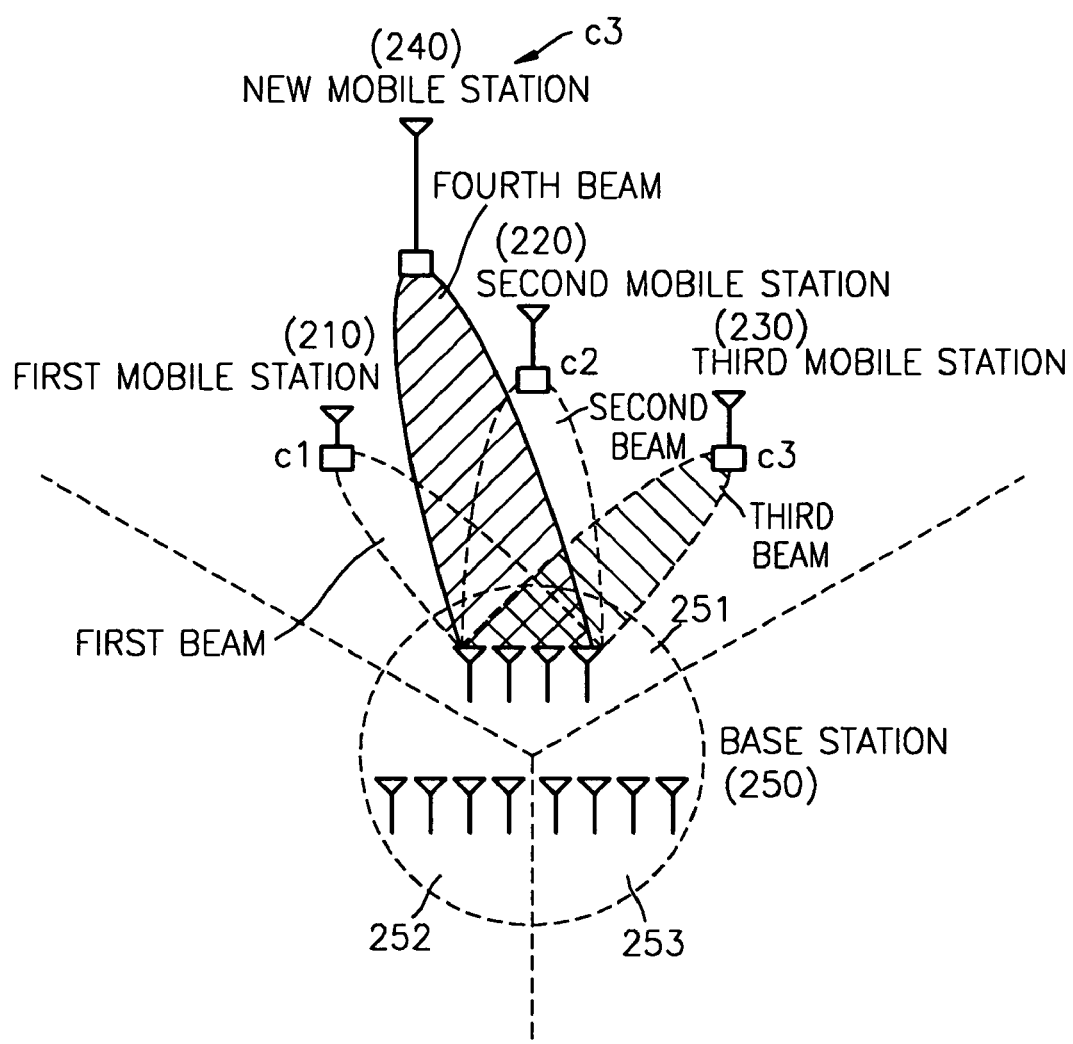
FIG. 2A is a conceptual diagram illustrating a code reuse method in a CDMA system according to the present invention.

A mobile communication system shown in FIG. 2A includes a first mobile station 210, a second mobile station 220, a third mobile station 230, and a base station 250. Here, we suppose that the base station 250 includes antenna arrays 251, 252, and 253, that the number of total codes usable by the antenna array 251 is 3, and that a first beam is transmitted to the first mobile station 210 via a first code c1, a second beam is transmitted to the second mobile station 220 via a second code c2, and a third beam is transmitted to the third mobile station 230 via a third code c3. When all the codes usable by the antenna array 251 are allocated to the mobile stations, if a new mobile station 240 requests communication, a method for allocating a code to the new mobile station 240 involves finding among the already used codes a code hardly affecting the existing communication and then allocating that code to the new mobile station 240. In FIG. 2A, it is apparent that there is a least amount of correlation or, intuitively, minimal overlap, between a fourth beam to be transmitted to the new mobile station 240 and the third beam. Therefore, the third beam, which is transmitted to the third mobile station 230, is a beam to be transmitted to the new mobile station 240. Accordingly, the code c3 used by the third mobile station may be reused by the new mobile station 240.

Figure 2B:
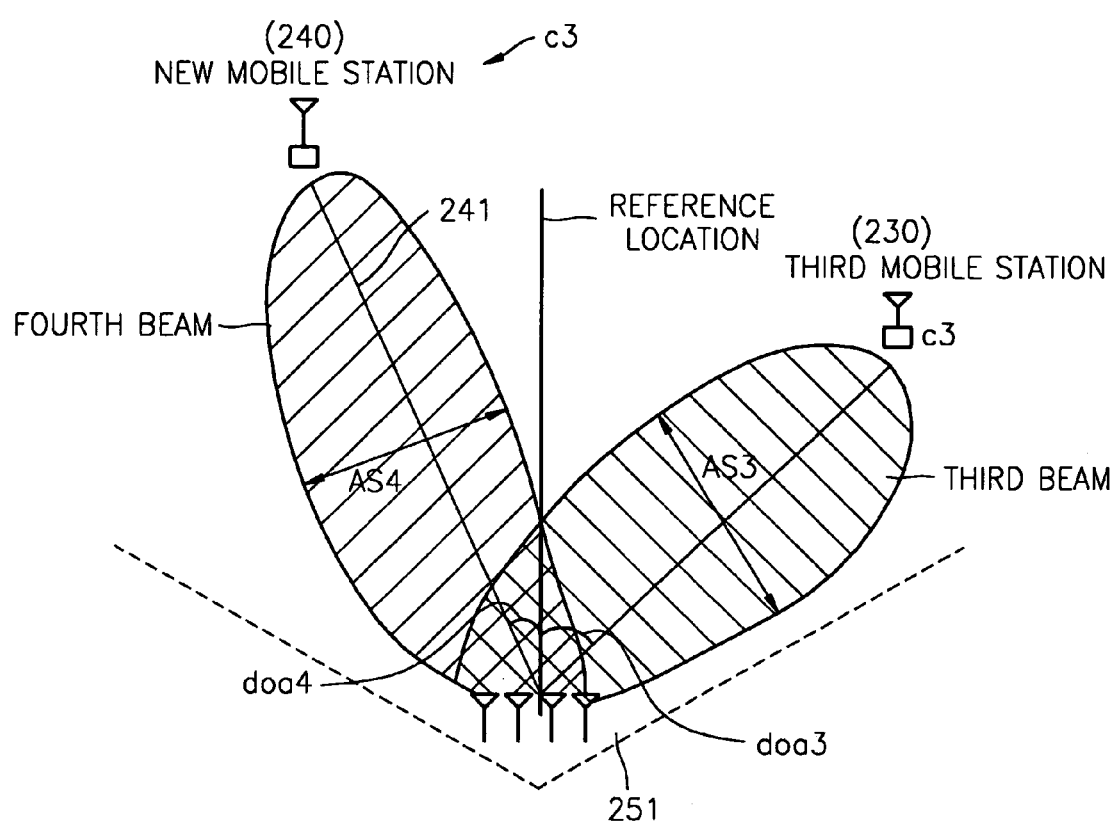
FIG. 2B is a diagram illustrating a correlation between beams in detail in the code reuse method illustrated in FIG. 2A.

FIG. 2B is a conceptual diagram of a method for measuring correlation between beams according to the present invention.

FIG. 2B illustrates only the third mobile station 230, the new mobile station 240, and the antenna array 251 of the system shown in FIG. 2A. While various methods may be used to measure correlation between beams, the present invention adopts a method using spatial information. The spatial information includes beam shape and size information. The beam shape information includes a departure of angle (doa) representing an angle made by a long axis 241 of the beam with a reference location and an angle spread (AS) reflecting the thickest portion of the beam in the direction of a short axis of the beam. According to the present invention, the beam shape information may consist of only the doa and AS. Thus, a correlation between two beams is examined based on the shape and size information of the beams. If the code of a beam with the least correlation is allocated again to a new mobile station based on the examination results, the same code may be reused without affecting the existing mobile stations communicating with the base station.

For example, referring to FIG. 2B, a correlation between information of the third beam transmitted to the third mobile station, which has doa3 and AS3, and information of the fourth beam, which has doa4 and AS4, is examined. When a value representing the correlation is less than a predetermined critical value, the same code c3 allocated to the third mobile station may be allocated to the new mobile station 240 requesting communication.

Figure 3:
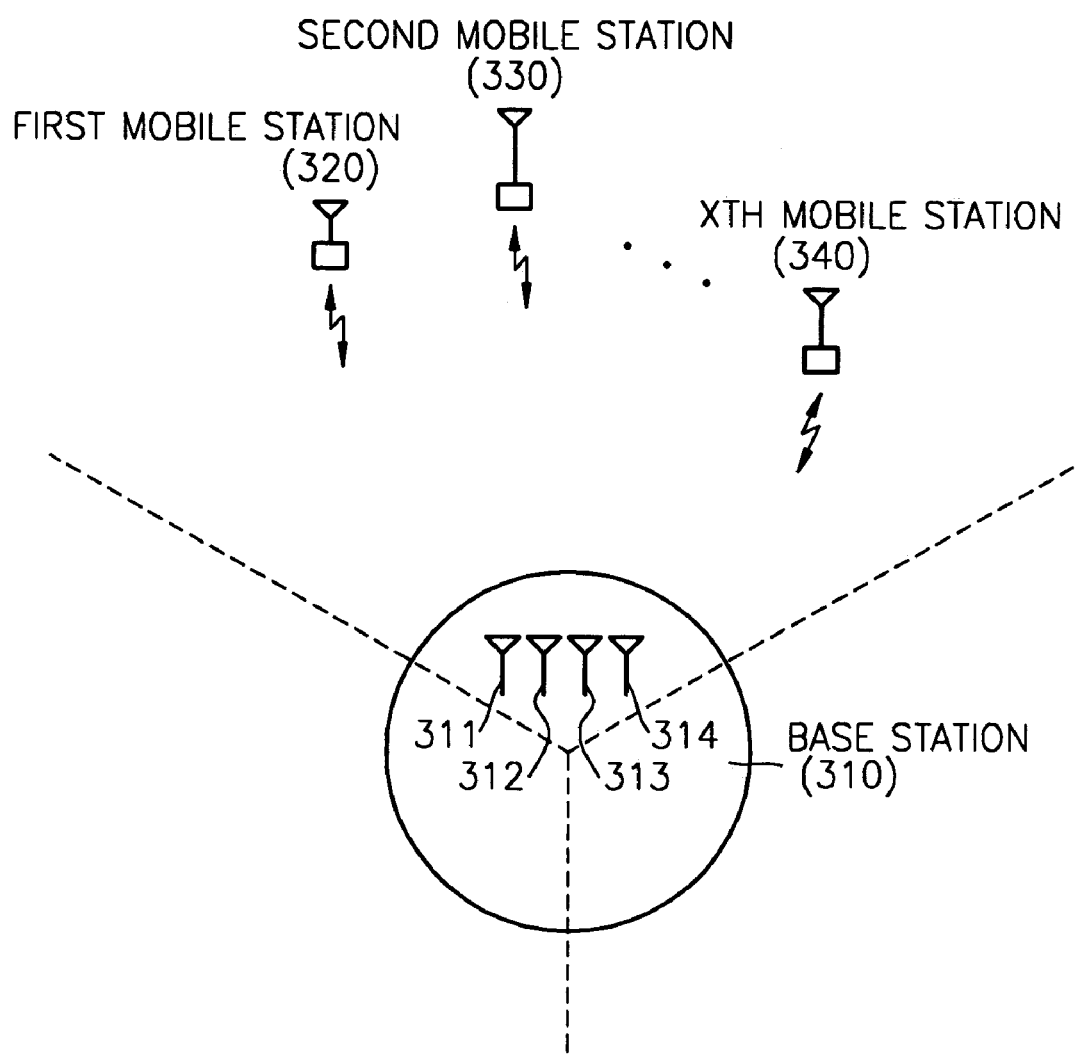
FIG. 3 is a schematic block diagram illustrating a wireless communication system according to the present invention.

FIG. 3 is a schematic block diagram illustrating an example of a wireless communication system according to the present invention.

A mobile communication system shown in FIG. 3 includes a base station 310, a first mobile station 320, a second mobile station 330, . . . , and an $X^{th}$ mobile station 340. An antenna array for managing any sector of the base station 310 includes antennas 311, 312, 313, and 314.

Figure 4:
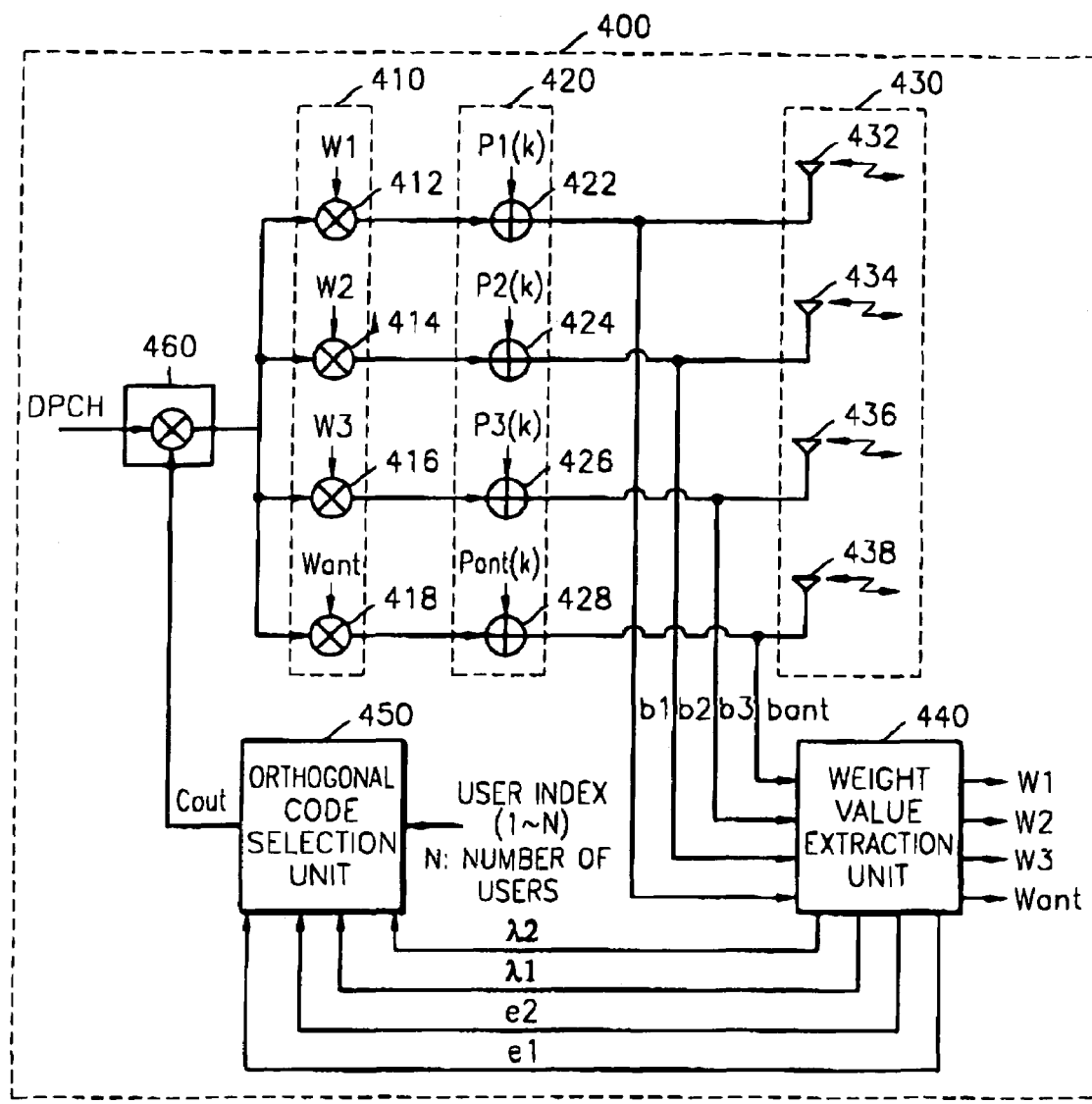
FIG. 4 is a schematic block diagram illustrating an example of a base station apparatus performing the code reuse method according to the present invention.

FIG. 4 is a schematic block diagram illustrating an example of a base station apparatus performing a code reuse method according to an embodiment of the present invention.

The base station apparatus 400 includes a multiplication unit 410, an addition unit 420, an antenna array 430, a weight value extraction unit 440, an orthogonal code selection unit 450 and a multiplexing unit 460.

The weight value extraction unit 440 restores long-term and short-term information from feedback signals b1, b2, b3, . . . , and bant received from the antenna array 430 through an uplink dedicated physical control channel (DPCCH), extracts a plurality of weight values from the restored long-term and short-term information, outputs the plurality of extracted weight values w1, w2, w3 . . . , and want to the multiplication unit 410, and outputs long-term information e1, e2, λ1, and λ2 among the restored information to the orthogonal code selection unit 450.

The orthogonal code selection unit 450 receives the long-term information e1, e2, λ1, and λ2 generated while the weight value extraction unit 440 extracts weight values, selects a code for a new mobile station, and outputs the selected code Cout to the multiplexing unit 460. Although the long-term information is represented by e1, e2, λ1, and λ2, in the above example according to an embodiment of the present invention, the present invention should not be construed as being limited thereto. That is, the long-term information e reflects spatial characteristics of a channel, i.e., information on the shape of a beam transmitted to each mobile station, and is represented by a vector having as many elements as there are antennas. For instance, when the number of antennas is 4, the long-term information e has e1, e2, e3, and e4, each of which is represented as a 4 by 1 vector. The size of each element of the long-term information is a scalar represented by λ. Accordingly, when the number of antennas is 4, the long-term information includes four vectors e1, e2, e3, and e4, and four scalars λ1, λ2, λ3, and λ4.

The multiplexing unit 460 multiplies a dedicated physical channel signal (DPCH) by a spread/scramble signal, which is the selected code Cout provided from the orthogonal code selection unit 450, and outputs the result as the multiplexed result to the multiplication unit 410.

The multiplication unit 410 multiples the output of the multiplexing unit 460 by the plurality of weight values w1, w2, w3, . . . , and want extracted from the weight value extraction unit 440, and outputs the multiplied results to the addition unit 420.

The addition unit 420 adds pilot channel signals P1 (k), P2(k), P3(k), . . . , and Pant(k) to the outputs of the multiplication unit 410 and outputs the results to the antenna array 430.

The antenna array 430 transmits the outputs of the addition unit 420 to the mobile station.

In the present invention, a correlation between mobile stations is calculated based on the long-term information and an orthogonal code is allocated to a new mobile station according to the calculation results, as will be described later. Here, it is possible to use as many long-term information vectors e as there are antennas. Preferably, considering complexity, only several effective values or high values are used as the long-term information vectors e. In an example of the present invention to be described later, two vectors e1 and e2 and two scalars λ1 and λ2 will be used as the long-term information.

Figure 5:
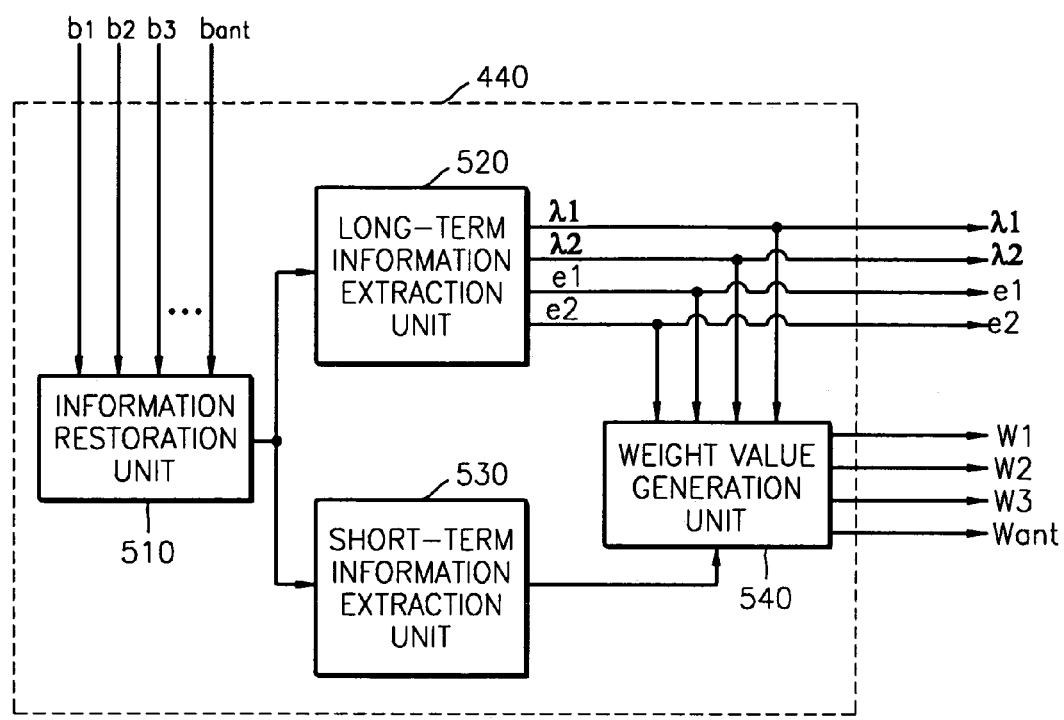
FIG. 5 is a block diagram illustrating an example of a detailed configuration of a weight value extraction unit illustrated in FIG. 4.

FIG. 5 illustrates an example of a detailed configuration of the weight value extraction unit 440 illustrated in FIG. 4.

The weight value extraction unit 440 includes an information restoration unit 510, a long-term information extraction unit 520, a short-term information extraction unit 530, and a weight value generation unit 540.

The information restoration unit 510 combines signals received from the antenna array 430 of FIG. 4, and restores the received signals to information signals. The long-term information extraction unit 520 extracts the long-term information λ1, λ2, e1 and e2 from the restored information signals and the short-term information extraction unit 530 extracts the short-term information from the restored information signals. The weight value generation unit 540 generates weight values by using the long-term information extracted by the long-term information extraction unit 520 as well as the short-term information extracted by the short-term information extraction unit 530, and outputs the generated weight values w1, w2, w3, . . . and want.

In the present invention, the information used for code reuse is the long-term information that may be extracted during weight value generation. As described above, the long-term information used for code reuse, which reflects spatial characteristics of a beam, may be extracted or generated by a variety of methods. The long-term information generation methods depart from the scope of the present invention, and therefore detailed descriptions of such methods will be omitted herein.

Figure 6:
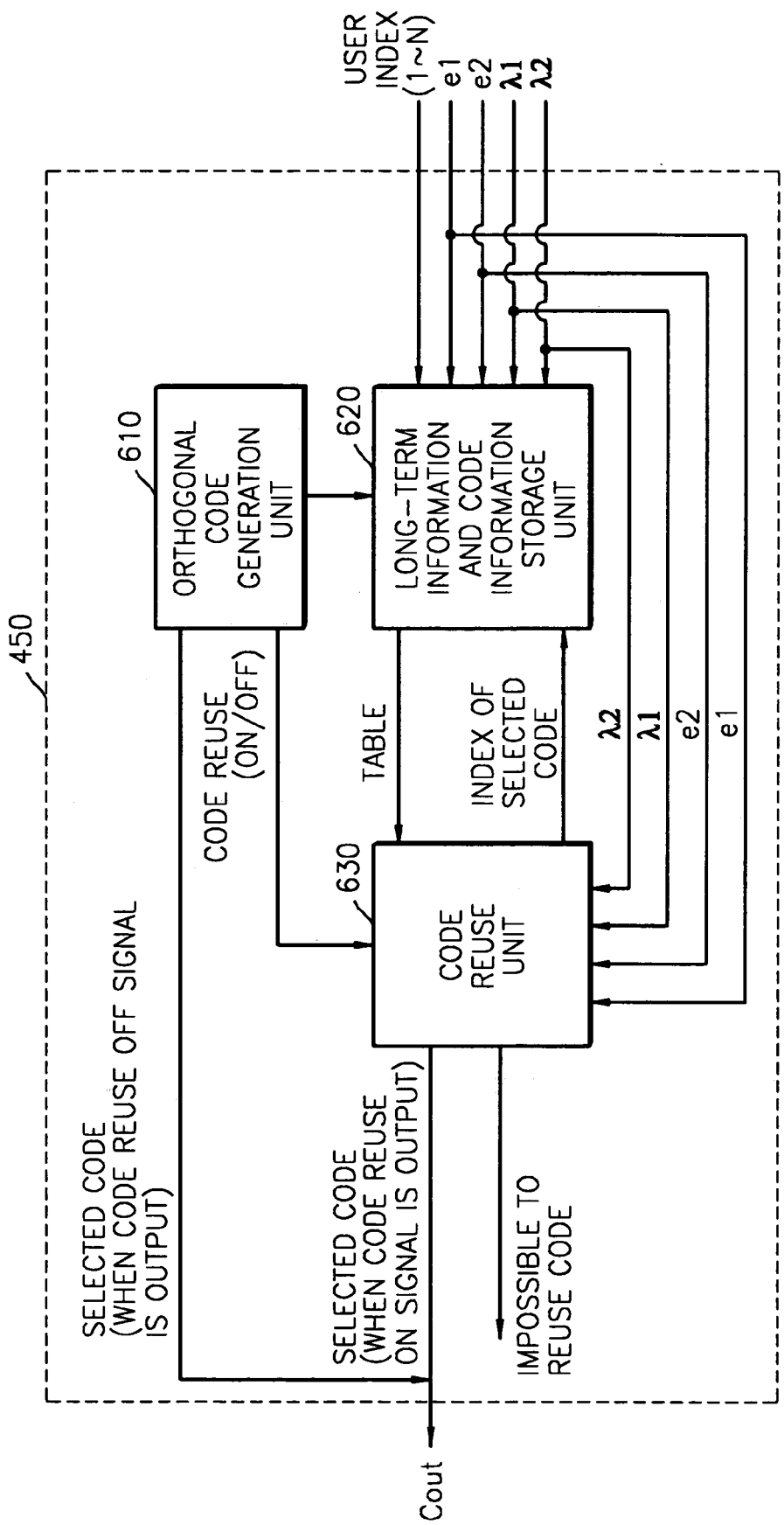
FIG. 6 is a block diagram illustrating an example of a detailed configuration of an orthogonal code selection unit illustrated in FIG. 4.

FIG. 6 illustrates an example of a detailed configuration of the orthogonal code selection unit 450 illustrated in FIG. 4.

The orthogonal code selection unit 450, which is an apparatus for obtaining the spread/scramble signal Cout of FIG. 4, includes an orthogonal code generation unit 610, a long-term information and code information storage unit 620, and a code reuse unit 630. The orthogonal code generation unit 610 determines whether a code will be reused or not. If it is determined that code reuse is not required, the orthogonal code generation unit 610 outputs a code reuse OFF signal to the code reuse unit 630 and directly outputs the selected code Cout. If it is determined that code reuse is required, the orthogonal code generation unit 610 outputs a code reuse ON signal to the code reuse unit 630 and outputs code information to the long-term information and code information storage unit 620.

The long-term information and code information storage unit 620 stores weight value information and code information for each user, that is, each mobile station. The code reuse unit 630 selects a code to reuse, or a reuse code, upon receiving the code reuse ON signal.

Figure 7:
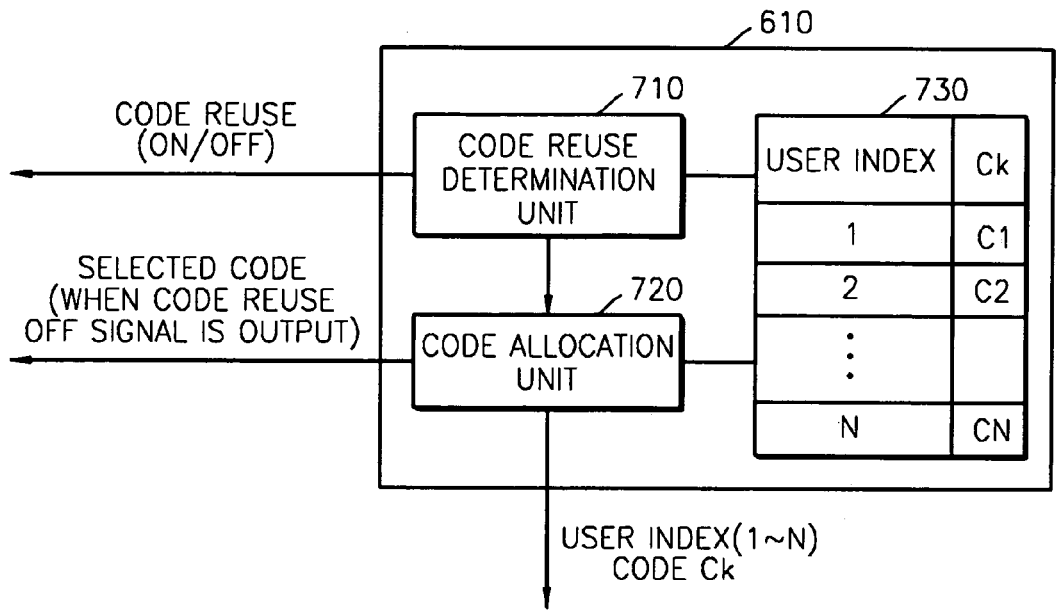
FIG. 7 is a block diagram illustrating an example of a detailed configuration of an orthogonal code generation unit illustrated in FIG. 6.

FIG. 7 illustrates an example of a detailed configuration of the orthogonal code generation unit 610 illustrated in FIG. 6. The orthogonal code generation unit 610 includes a code reuse determination unit 710, a code allocation unit 720, and a code table 730.

If a number of codes usable by a base station is N, the code allocation unit 720 allocates codes Ck, for k=1 to N, of the code table 730 one by one to the first through N[th] users. At this time, to determine whether a usable code remains, the code reuse determination unit 710 refers to the code table 730 and determines whether any code remains to be allocated to a user (mobile station) requesting communication. If it is determined that one or more codes remain, the code reuse determination unit 710 outputs a code reuse OFF signal and directs the code allocation unit 720 to allocate one of the remaining codes to the user. Then, the code allocation unit 720 directly outputs a selected one of the remaining codes.

If it is determined that no code remains to be used by a new user requesting communication, the code reuse determination unit 710 outputs a code reuse ON signal to the code reuse unit 630 of FIG. 6, and directs the code allocation unit 720 to output the contents of the code table 730, i.e., a user index 1 to N and a code value corresponding to the index Ck, for k=1 to N. The code allocation unit 720 outputs the contents of the code table 730 to the long-term information and code information storage unit 620 of FIG. 6, in response to the received instructions.

Figure 8:
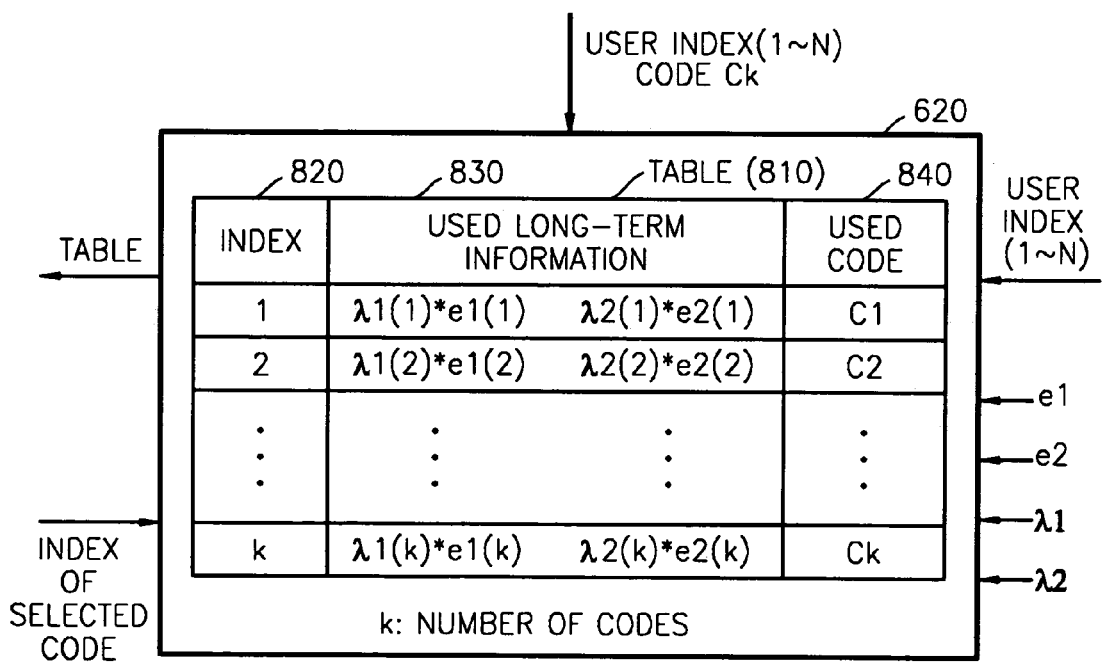
FIG. 8 is a block diagram illustrating an example of a detailed configuration of a long-term information and code information storage unit illustrated in FIG. 6.

FIG. 8 illustrates an example of a detailed configuration of the long-term information and code information storage unit 620 illustrated in FIG. 6.

The long-term information and code information storage unit 620 has a table 810 containing long-term information and code information. Items of the table 810 include a user index 820, i.e., 1, . . . , k, long-term information 830, i.e., λ1(1)*e1(1), λ2(1)*e2(1), . . . , λ1(k)*e1(k), λ2(k)*e2(k) of each user, and a code 840, i.e., C1, . . . , Ck, allocated to each user.

Figure 9:
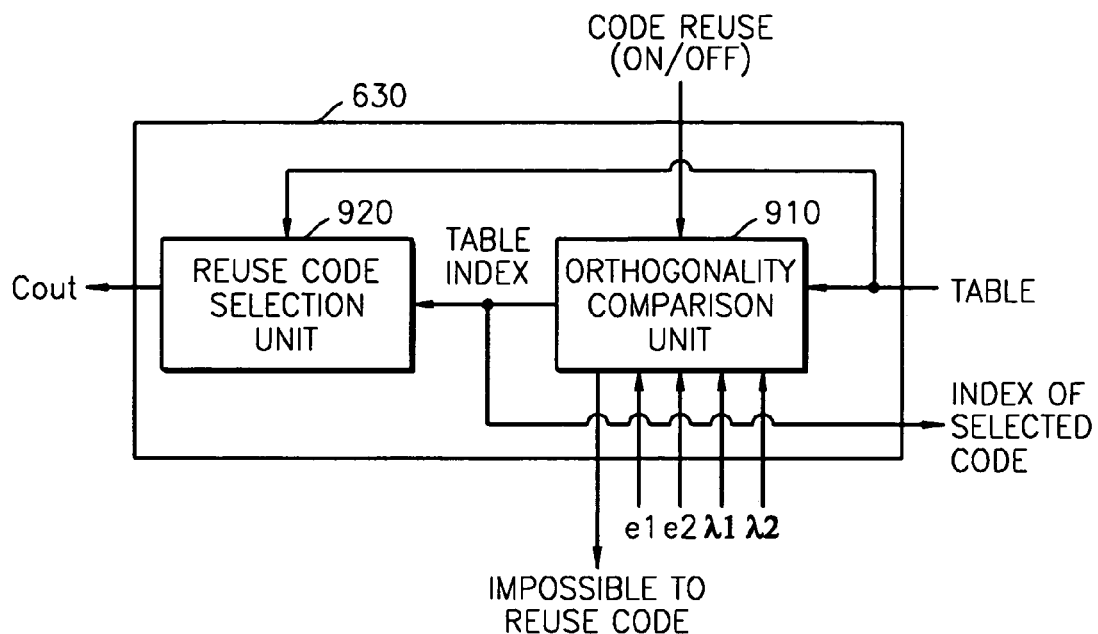
FIG. 9 is a block diagram illustrating an example of a detailed configuration of a code reuse unit illustrated in FIG. 6.

FIG. 9 illustrates an example of a detailed configuration of the code reuse unit 630 illustrated in FIG. 6.

The code reuse unit 630 includes an orthogonality comparison unit 910 and a reuse code selection unit 920. In a case that the code reuse ON signal is received from the code reuse determination unit 710 of the orthogonal code generation unit 610, both of FIG. 7, the orthogonality comparison unit 910 examines orthogonality by using the long-term information of users contained in the contents of the table received from the code allocation unit 720 of FIG. 7, as well as long-term information of a new user, and outputs the examination results to the reuse code selection unit 920. The reuse code selection unit 920 selects a reuse code according to the orthogonality examination results and outputs the selected reuse code as Cout.

Figure 10:
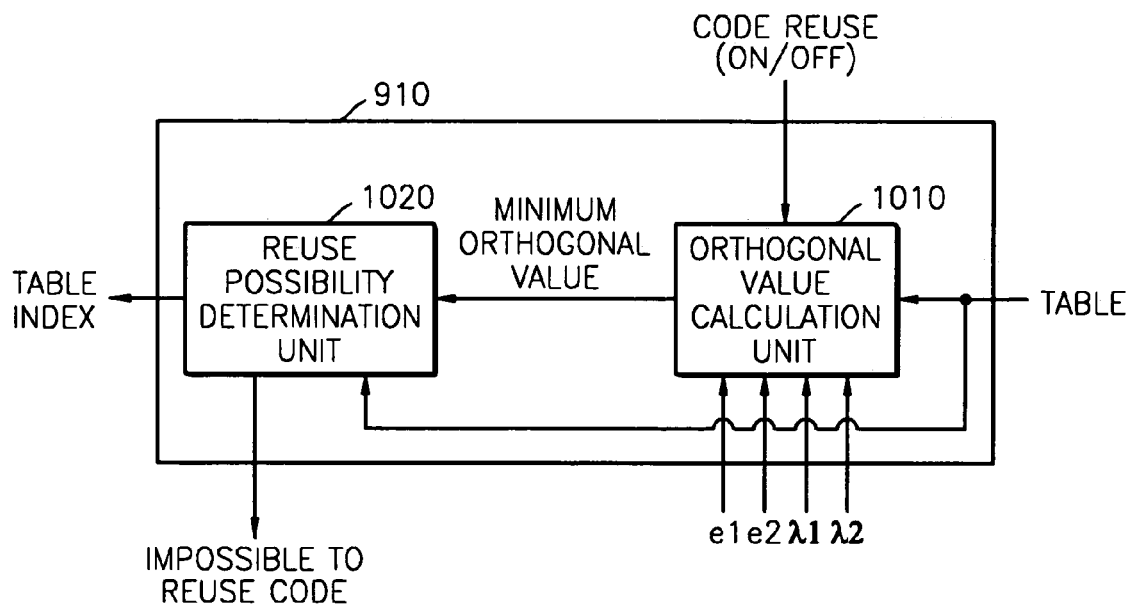
FIG. 10 is a block diagram illustrating an example of a detailed configuration of an orthogonality comparison unit illustrated in FIG. 9.

FIG. 10 illustrates an example of a detailed configuration of the orthogonality comparison unit 910 illustrated in FIG. 9.

The orthogonality comparison unit 910 includes an orthogonal value calculation unit 1010 and a reuse possibility determination unit 1020. The orthogonal value calculation unit 1010 calculates orthogonal values of the long-term information contained in the table received from the code allocation unit 720, which includes the long-term information of the existing users using already allocated codes, with long-term information of the new user requesting communication received from the long-term information extraction unit 520 of FIG. 5. If the number of usable codes is N, N orthogonal values will be calculated. The minimum orthogonal value is selected from the resulting orthogonal values and is output to the reuse possibility determination unit 1020.

Figure 11:
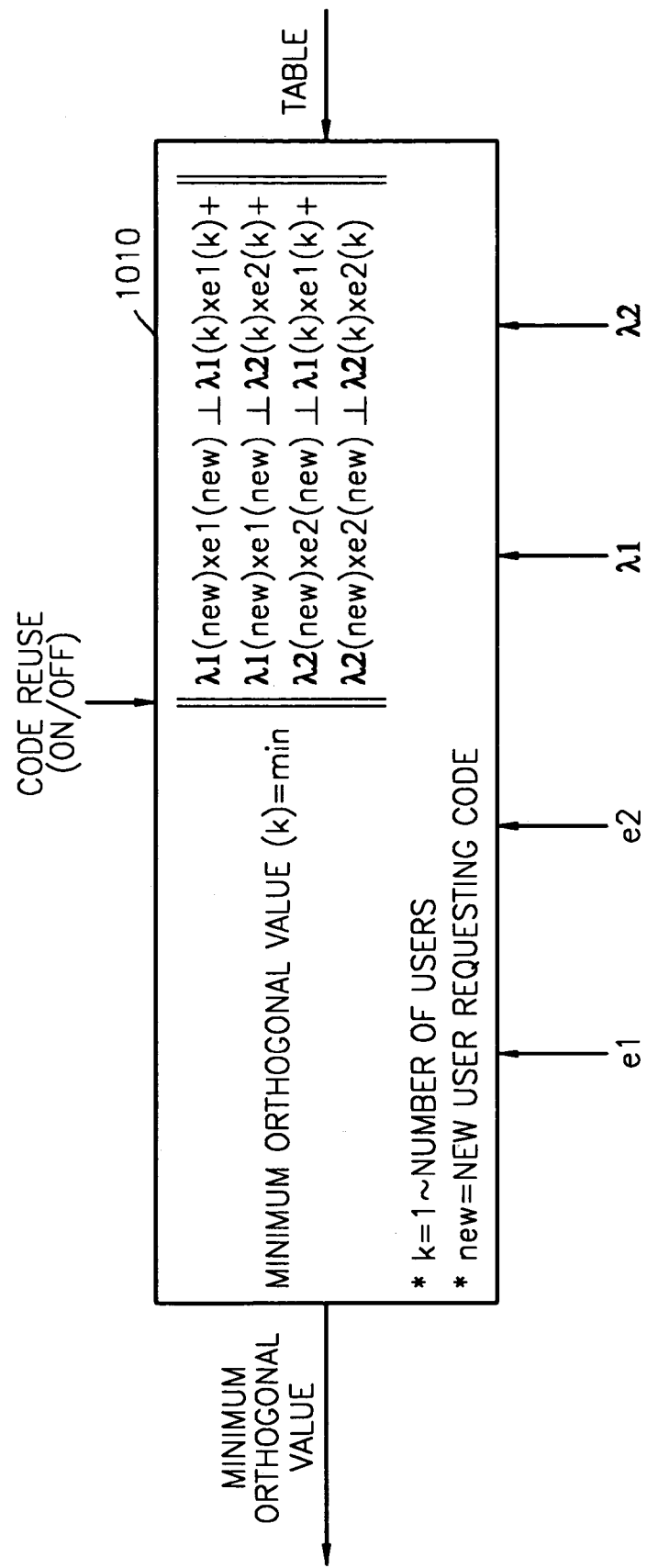
FIG. 11 is a block diagram illustrating an example of a detailed configuration of an orthogonal value calculation unit illustrated in FIG. 10.

FIG. 11 illustrates an example of a detailed configuration of the orthogonal value calculation unit 1010 illustrated in FIG. 10.

As described above, the information e reflects spatial characteristics, i.e., a departure of angle (doa) and an angle spread (AS) of a beam, and is a vector having a number of elements equal to the number of antennas included in the antenna array. The information λ reflects the size of a vector e.

For instance, FIG. 11 shows a portion of a calculation of the orthogonal value between the new user and existing user (1) using the already allocated code, as follows. Here, the long-term information e1 (new) of the new user is a 4 by 1 vector having four elements w1, w2, w3, and w4 (not shown in FIG. 11), and the long-term information e1 (1) is a 4 by 1 vector having four elements u1, u2, u3, and u4 (not shown in FIG. 11).

$$\lambda 1(\text{new}) \times e1(\text{new}) \perp \lambda 1(1) \times e1(1)$$ [Equation]

$$= \lambda 1(\text{new}) \times [w1, w2, w3, w4] \perp \lambda 1(1) \times \begin{bmatrix} v1 \\ v2 \\ v3 \\ v4 \end{bmatrix}$$

$$= \lambda 1(\text{new}) \times \lambda 1(1) \times [w1v1 + w2v2 + w3v3 + w4v4]$$

According to the above Equation, the first term of the orthogonal value calculation becomes a scalar value, and thus the orthogonal value between the new mobile station and the existing mobile station (1) becomes a scalar value. To this end, orthogonal values between all of the existing mobile stations 1:N having already allocated codes and the new mobile station are calculated, and the N orthogonal values are obtained. The orthogonal value calculation unit 1010 selects the minimum orthogonal value from the N orthogonal values and outputs the selected minimum value to the reuse possibility determination unit 1020.

Figure 12:
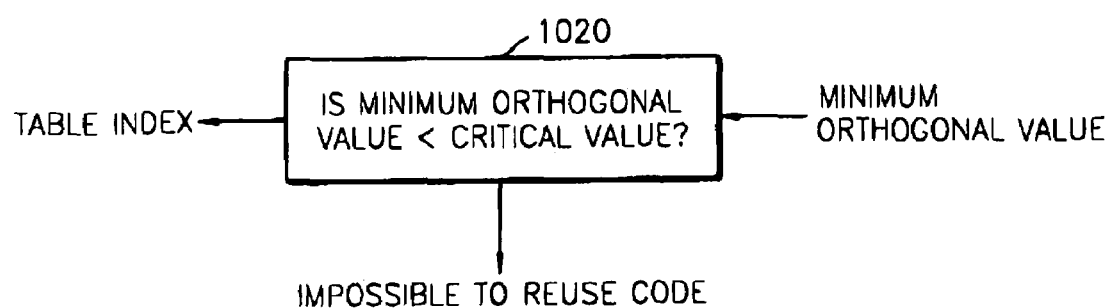
FIG. 12 is a block diagram illustrating an example of a detailed configuration of a reuse possibility determination unit illustrated in FIG. 10.

FIG. 12 illustrates an example of a detailed configuration of the reuse possibility determination unit 1020 illustrated in FIG. 10.

The reuse possibility determination unit 1020 determines whether the minimum orthogonal value received from the orthogonal value calculation unit 1010 of FIG. 10 is less than a predetermined critical value. If the result is that the minimum orthogonal value is not less than the predetermined critical value, it may be concluded that the most uncorrelated code value is more than the critical value. In this case there is no appropriate reuse code and the reuse possibility determination unit 1020 outputs a code reuse OFF signal. However, if the minimum orthogonal value is less than the predetermined critical value, it may be concluded that the most uncorrelated code value is less than the critical value. In this case it is possible to reuse the code and the reuse possibility determination unit 1020 outputs the table index having the minimum orthogonal value to the reuse code selection unit 920 of FIG. 9. Meanwhile, the output table index is also transmitted to the long-term information and code information storage unit 620 of FIG. 6 so as to be stored in the long-term information and code information storage unit 620 and used when a code is determined for a next new user.

Figure 13:
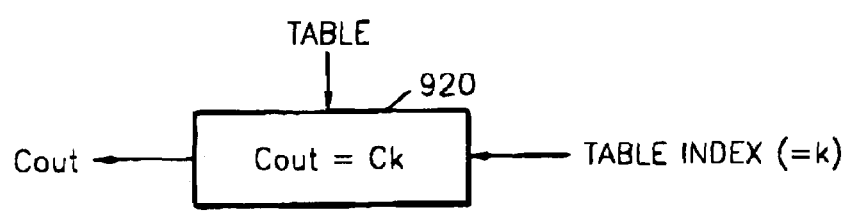
FIG. 13 is a block diagram illustrating an example of a detailed configuration of a reuse code selection unit illustrated in FIG. 9.

FIG. 13 illustrates an example of a detailed configuration of the reuse code selection unit 920 illustrated in FIG. 9. The reuse code selection unit 920 receives the user index having the minimum orthogonal value from the orthogonality comparison unit 910 of FIG. 9, receives the contents of the table from the long-term information and code information storage unit 620 of FIG. 6, finds the table index from the table, and outputs the code included in the index as a spread/scramble signal, i.e. Cout.

Hereinafter, steps of a code reuse method in a CDMA system according to the present invention will be described with reference to FIGS. 14 through 17.

Figure 14:
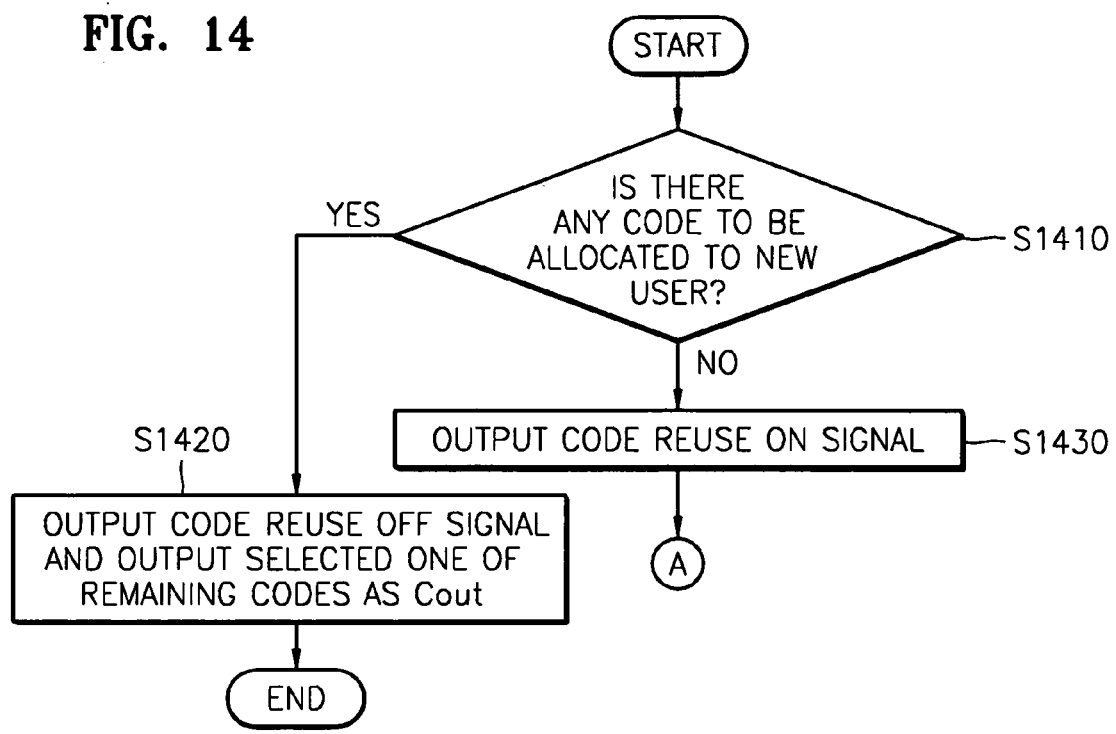
FIG. 14 is a flowchart illustrating operating steps of the orthogonal code generation unit illustrated in FIG. 6.
Figure 15:
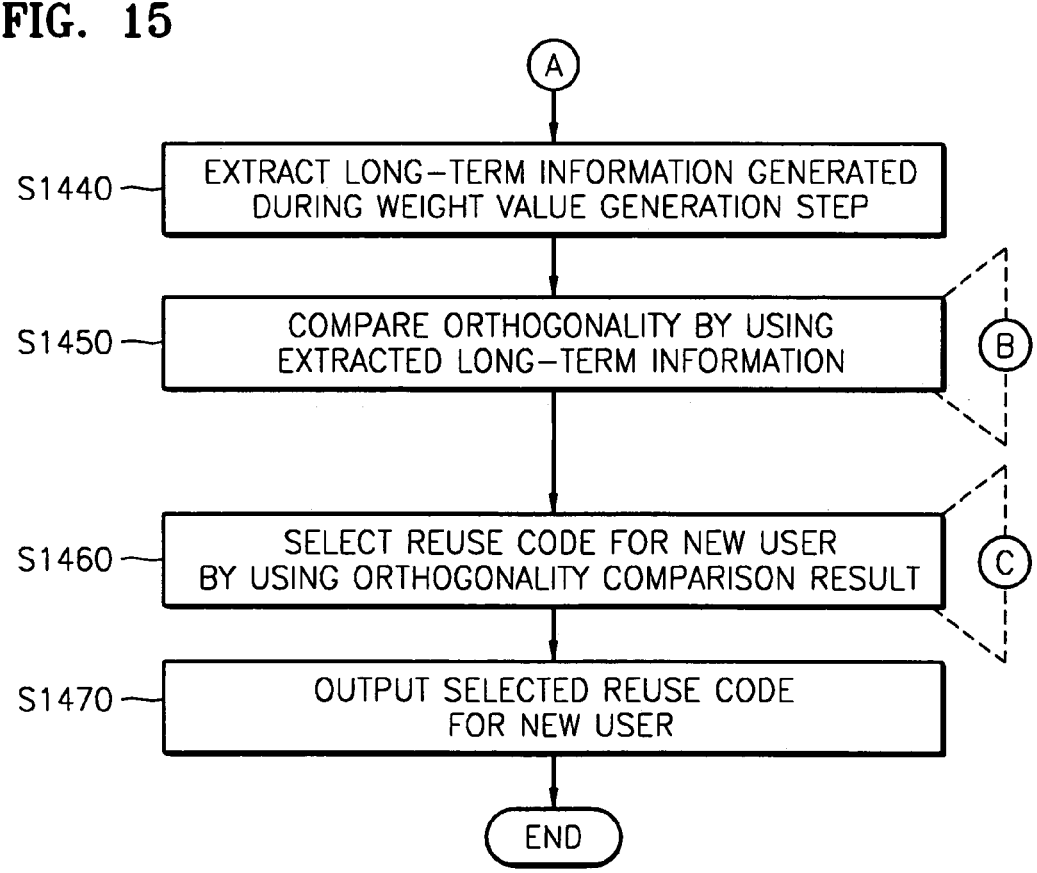
FIG. 15 is a flowchart illustrating operating steps of the code reuse unit illustrated in FIG. 6.
Figure 16:
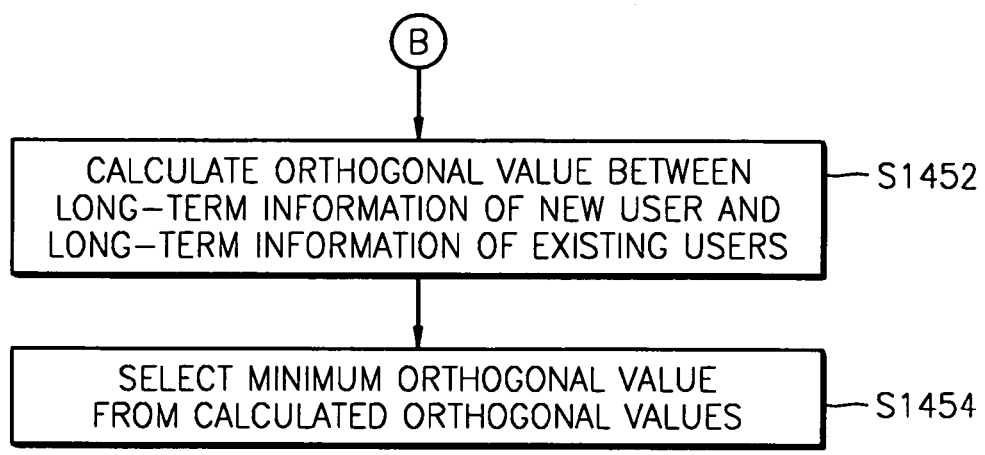
FIG. 16 is a flowchart illustrating operating steps of the orthogonal value calculation unit illustrated in FIG. 10.
Figure 17:
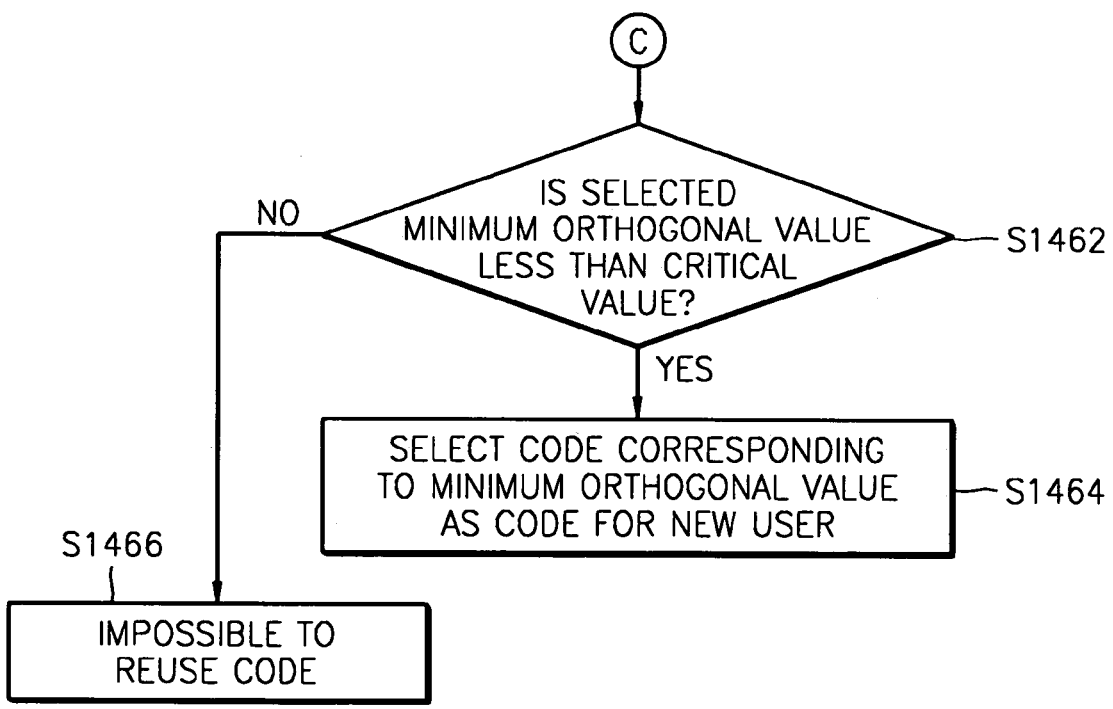
FIG. 17 is a flowchart illustrating operating steps of the reuse possibility determination unit illustrated in FIG. 10.

FIG. 14 illustrates operating steps of the orthogonal code generation unit 610 illustrated in FIG. 6. FIGS. 15 through 17 illustrate operating steps of the long-term information and code information storage unit 620 as well as the code reuse unit 630, both of FIG. 6.

The orthogonal code generation unit 610 of FIG. 6 determines whether a code remains to be allocated to a new user requesting communication (step 1410). Whenever a new user requests communication, the orthogonal code generation unit 610 allocates an orthogonal code to the new user. Here, because the number of usable orthogonal codes is limited, after the orthogonal codes are all used, a determination step for allocating one of the already used codes to a new user requesting communication is required.

When it is determined in step 1410 that one or more codes remain to be allocated to the new user, one of the remaining codes may be allocated. In this case, as no additional code reuse work is required, the orthogonal code generation unit 610 outputs the code reuse OFF signal and outputs a selected one of the remaining codes as Cout (step 1420).

When it is determined in step 1410 that no code remains to be allocated to the new user, the orthogonal code generation unit 610 outputs a code reuse ON signal to activate code reuse work (step 1430).

FIG. 15 illustrates operating steps of the code reuse unit 630 of FIG. 6 when the code reuse ON signal is received from the orthogonal code generation unit 610 of FIG. 6.

To begin with, long-term information, which is generated during the weight value generation step, is extracted (step 1440). That is, the long-term information extraction unit 520 of the weight value extraction unit 440 extracts the long-term information from the information signal restored from the information restoration unit 510, such that the weight value is generated by the weight value generation unit 540, as illustrated in FIG. 5. In the present invention, to utilize the long-term information extracted by the long-term information extraction unit 520 of FIG. 5, the extracted long-term information is provided to the orthogonal code selection unit 450 shown in FIG. 4.

Thereafter, the code reuse unit 630 of the orthogonal code selection unit 450 compares orthogonality by using the received long-term information, as shown in FIG. 6 (step 1450).

The step of comparing orthogonality will be described in detail with reference to FIG. 16. To begin with, the long-term information extracted by the long-term information extraction unit 520 is stored in the long-term information and code information storage unit 620 to be used by the orthogonal code selection unit 450 as shown in FIGS. 5 and 6. The long-term information and code information storage unit 620 receives orthogonal code data of the existing users from the orthogonal code generation unit 610 and receives the long-term information of the existing users from the long-term information extraction unit 520. Thus, the long-term information and code information storage unit 620 stores the orthogonal code and long-term information of each existing user in the form of a table 810 (FIGS. 5, 6 and 8).

Next, the orthogonal value calculation unit 1010 of the orthogonality comparison unit 910 in the code reuse unit 630 receives the table contents from the long-term information and code information storage unit 620, calculates the orthogonal value between the long-term information of each of the existing users from the table and long-term information of the new user from the long-term information extraction unit 520 of FIG. 5 (step 1452), and selects the minimum orthogonal value from the calculated orthogonal values (step 1454), as shown in FIGS. 8–10.

Referring again to FIGS. 15 and 10, the minimum orthogonal value selected by the orthogonal value calculation unit 1010 is transmitted to the reuse possibility determination unit 1020, which selects a reuse code for the new user based on the minimum orthogonal value (step 1460).

Referring to FIG. 17, the step of selecting the reuse code will be described in detail. The reuse possibility determination unit 1020 (FIG. 10) determines whether the selected minimum orthogonal value is less than a critical value (step 1462). If the minimum orthogonal value is determined to be less than the critical value, the table index of the long-term information having the minimum orthogonal value is output to the reuse code selection unit 920 of FIG. 9 (step 1464). If the minimum orthogonal value is not less than the critical value, there is no code usable by the new user among the already used codes, i.e., it is impossible to reuse a code. Therefore, the reuse possibility determination unit 1020 transmits a code reuse OFF signal (step 1466).

Referring again to FIG. 15, the reuse possibility determination unit 1020 continuously outputs the selected reuse code for the new user (step 1470). Then, the code reuse determination step is completed.

Figure 18A:
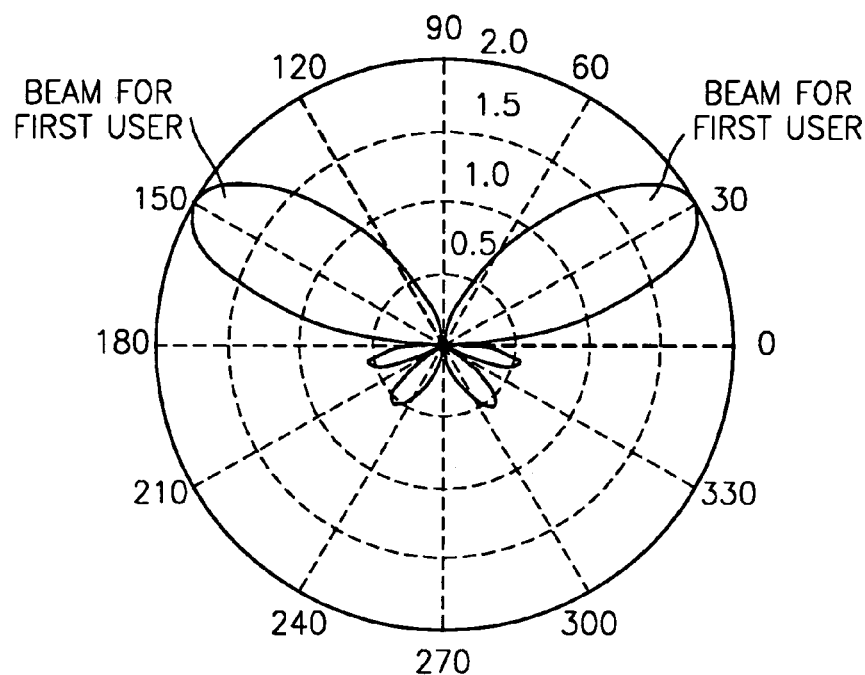
Figure 18B:
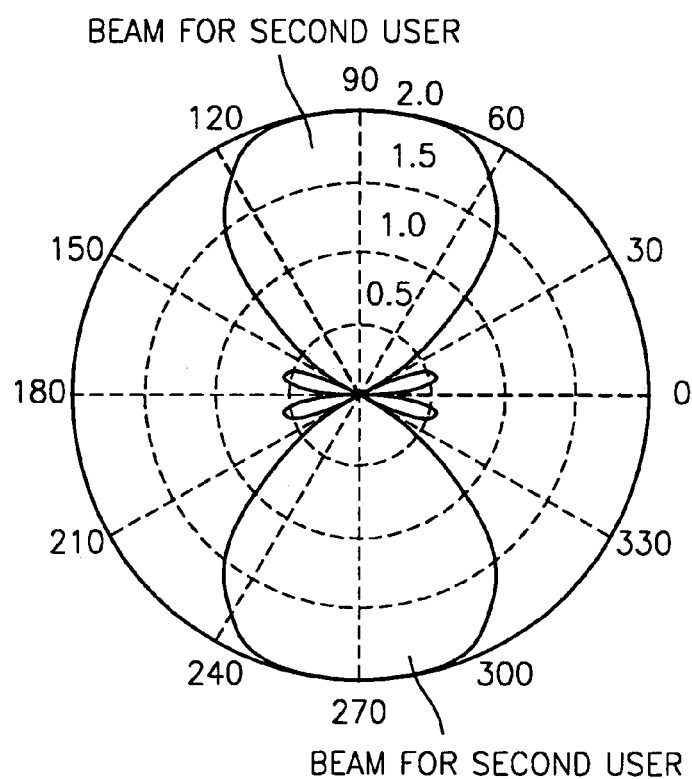
Figure 18C:
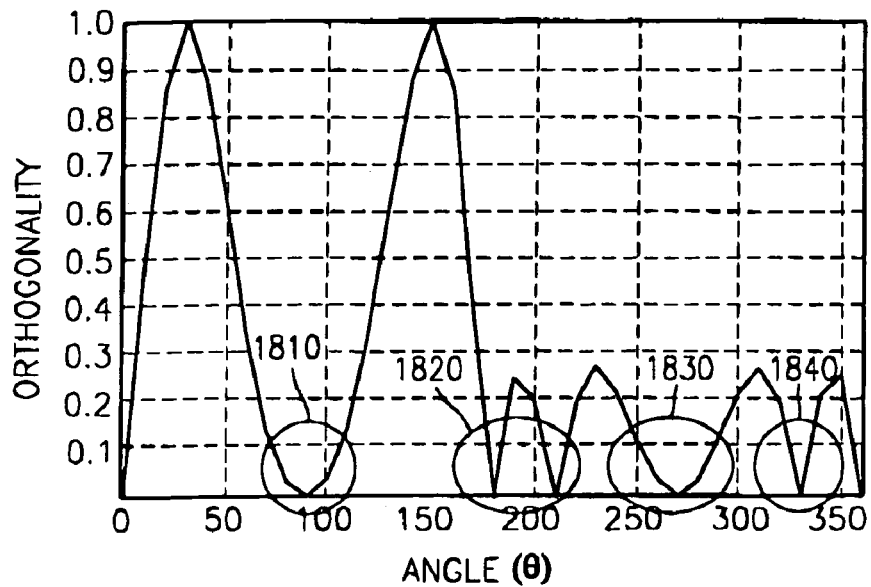

FIGS. 18A through 18C are diagrams illustrating simulation results showing locations where a second user may use the same code as a code allocated to a first user according to the code reuse method of the present invention.

FIG. 18A illustrates the shape of a beam used by the first user. The first user uses a long-term information $a_1$ calculated using doa=30° and AS=15°. The beam has a larger value at 30° and 150°, but when a range from 0° to 120° is regarded as a sector, it can be confirmed in FIG. 18A that the beam for the first user is 30°. In this case, orthogonality between the first user and the second user is examined using the long-term information and the result, i.e., a direction where the orthogonal value is a minimum, is indicated in FIG. 18C.

As illustrated in FIG. 18C, the directions ($\theta$) satisfying the condition that the orthogonal value between the long-term information $a_1$ of the first user and the long-term information $\alpha_2$ of the second user is smaller than the predetermined critical value, i.e., $|a_1^H(\theta) \cdot \alpha_2(\theta)|^2 < \epsilon$ are 90° (1810), 170° (1820), 270° (1830), and 340° (1840). Here, it is supposed that the critical value $\epsilon$ is 10%. If the sector where beams are transmitted is 360°, as illustrated in FIG. 18C, regions where a user can use the same code or the same long-term information as the first user are present in four directions.

If the sector where beams are transmitted is 120° like the present example shown in FIG. 18B, a second user located at 90° may use the same code as the first user. In this case, as the two users may utilize the same code in one sector of 120°, reusability may be doubled.

Figure 19:
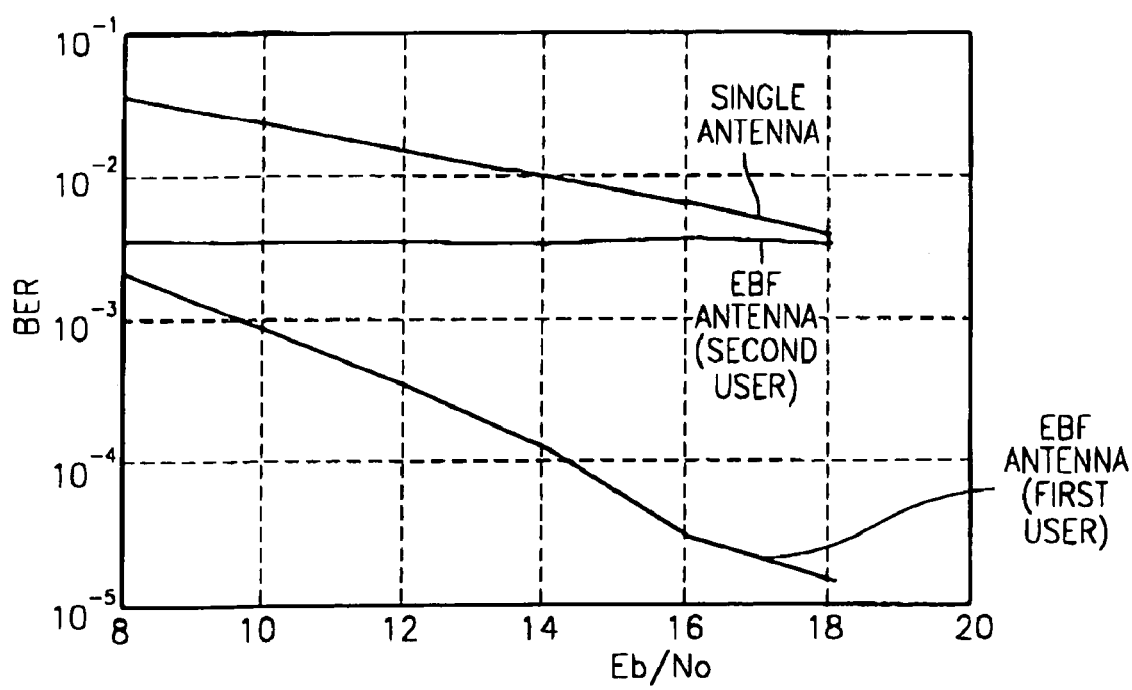
FIG. 19 illustrates simulation results showing a performance when first and second users use the same code according to the code reuse method of the present invention.

FIG. 19 is a graph of simulation results reflecting performance when first and second users use the same code according to the code reuse method of the present invention, and performance of a conventional system using a single antenna. In the graph, the first and second users are labeled as EBF antenna (first user) and EBF antenna (second user), to indicate an eigenbeamforming antenna of the present invention. The graph shows a bit error rate BER versus a signal to noise ratio Eb/No.

Here, we suppose that the first user has doa=0° and AS=30° and the second user has doa=90° and AS=30°, and that a power of the first user ranges from −10 dB to 0 dB and a power of the second user is fixed at −10 dB. As illustrated in FIG. 19, even if the first and second users utilize the same code, performance is improved as compared with the conventional system using a single antenna, and equivalent eigenbeamforming performance may be achieved.

According to the present invention as set forth above, in a CDMA wireless communication system using eigenbeamforming, when a base station has power left to spare and lacks a code to be allocated to a new mobile station requesting communication, an already allocated code may be reused. Consequently, the number of mobile stations that the base station may substantially serve may be close to the theoretic number of mobile stations corresponding to the power gain by beamforming.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A code reuse method in a code division multiple access wireless communication system using beamforming by an antenna array, the method comprising:

(a) examining a spatial correlation between a new mobile station requesting communication and each of existing mobile stations using already allocated codes, based on long-term information reflecting spatial characteristics of beams transmitted to the new and existing mobile stations, examining including calculating orthogonal values between the long-term information of the new mobile station and the long-term information of the existing mobile stations using the already allocated codes; and (b) selecting one among the already allocated codes to reuse as a code for the new mobile station depending on the results of the correlation examination.

2. The method as claimed in claim 1, wherein the long-term information includes beam shape and beam size information.

3. The method as claimed in claim 2, wherein the beam shape information includes a departure of angle representing an angle formed between a beam transmitted to a mobile station and a base station, and an angle spread reflecting a thickness of the beam.

4. The method as claimed in claim 1, wherein (a) further comprises:

selecting a minimum orthogonal value from the calculated orthogonal values; and comparing the selected minimum orthogonal value with a predetermined critical value.

5. The method as claimed in claim 4, wherein (b) further comprises selecting an already allocated code of an existing mobile station having the minimum orthogonal value as the code for the new mobile station when the selected minimum orthogonal value is less than the predetermined critical value.

6. A code reuse apparatus in a code division multiple access wireless communication system using beamforming by an antenna array, the apparatus comprising:

a correlation examination unit for examining a spatial correlation between a new mobile station requesting communication and each of existing mobile stations using already allocated codes, based on long-term information reflecting spatial characteristics of beams transmitted to the new and existing mobile stations, wherein the correlation examination unit calculates orthogonal values between the long-term information of the new mobile station and the long-term information of the existing mobile stations using the already allocated codes; and a reuse code selection unit for selecting one among the already allocated codes to reuse as a code for the new mobile station depending on the results of the correlation examination.

7. The apparatus as claimed in claim 6, wherein the long-term information includes beam shape and beam size information.

8. The apparatus as claimed in claim 7, wherein the beam shape information includes a departure of angle representing an angle formed between a beam transmitted to a mobile station and a base station, as well as an angle spread reflecting a thickness of the beam.

9. The apparatus as claimed in claim 6, wherein the correlation examination unit selects a minimum orthogonal value from the calculated orthogonal values and compares the selected minimum orthogonal value with a predetermined critical value.

10. The apparatus as claimed in claim 9, wherein the reuse code selection unit selects an already allocated code of an existing mobile station having the minimum orthogonal value as the code for the new mobile station when the selected minimum orthogonal value is less than the predetermined critical value.

11. A code reuse apparatus in a code division multiple access wireless communication system using beamforming by an antenna array, the apparatus comprising:

an orthogonal code generation unit for determining whether a code will be reused or not and generating orthogonal code information according to the determination results; and a code reuse unit for examining a spatial correlation between a new mobile station requesting communication and each of existing mobile stations using already allocated codes, based on long-term information and selecting one among the already allocated codes to reuse as a code for the new mobile station depending on the results of the correlation examination, the code reuse unit including an orthogonality comparison unit for comparing the long-term information of the existing mobile stations having the already allocated codes with long-term information of the new mobile station, when the orthogonal code generation unit determines a code will be reused.

12. The apparatus as claimed in claim 11, wherein the code reuse unit further comprises:

a reuse code selection unit for selecting an already allocated code as a code for the new mobile station depending on the results of the orthogonality comparison.

13. The apparatus as claimed in claim 12, wherein the orthogonality comparison unit comprises:

a minimum orthogonal value selection unit for selecting a minimum orthogonal value among orthogonal values between the long-term information of the existing mobile stations using the already allocated codes and the long-term information of the new mobile station requesting communication; and a reuse possibility determination unit for outputting an index having the minimum orthogonal value to the reuse code selection unit when the selected minimum orthogonal value is less than a predetermined critical value.

14. The apparatus as claimed in claim 13, wherein the reuse code selection unit receives the index from the reuse possibility determination unit and selects a code corresponding to the index as the code for the new mobile station.

15. The apparatus as claimed in claim 11, wherein the long-term information includes beam shape and beam size information.

16. The apparatus as claimed in claim 15, wherein the beam shape information includes a departure of angle representing an angle formed between a beam transmitted to a mobile station and a base station, as well as an angle spread reflecting a thickness of the beam.

17. The apparatus as claimed in claim 11, further comprising a long-term information and code information storage unit for storing long-term information reflecting spatial characteristics of beams transmitted to existing mobile stations and code information allocated to the existing mobile stations.

18. The apparatus as claimed in claim 17, wherein the orthogonal code generation unit includes:
  a code reuse determination unit for determining whether an unused code remains to be allocated to the new mobile station, outputting a code reuse OFF signal to the code reuse unit when an unused code remains, and outputting a code reuse ON signal to the code reuse unit when no unused code remains; and
  a code allocation unit for allocating a remaining unused code to the new mobile station when the code reuse OFF signal is output, and outputting the code information allocated to the existing mobile stations to the long-term information and code information storage unit when the code reuse ON signal is output.

19. The apparatus as claimed in claim 18, wherein the long-term information and code information storage unit further stores a mobile station index corresponding to the stored long-term information and code information.

* * * * *